March 26, 1963 E. HITZELBERGER 3,083,049
DOOR FRAME CONSTRUCTION FOR MOTOR VEHICLES
Filed July 13, 1959 2 Sheets-Sheet 1
FIG. 1.
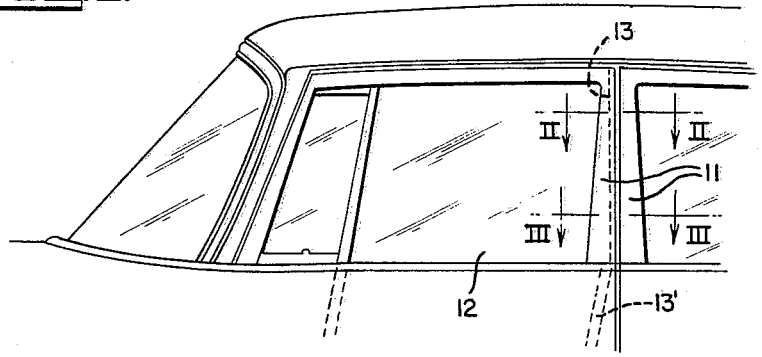
FIG. 2.
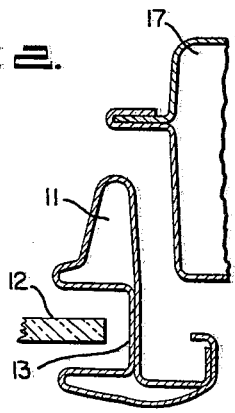
FIG. 3.
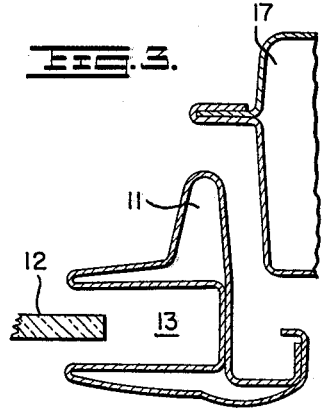
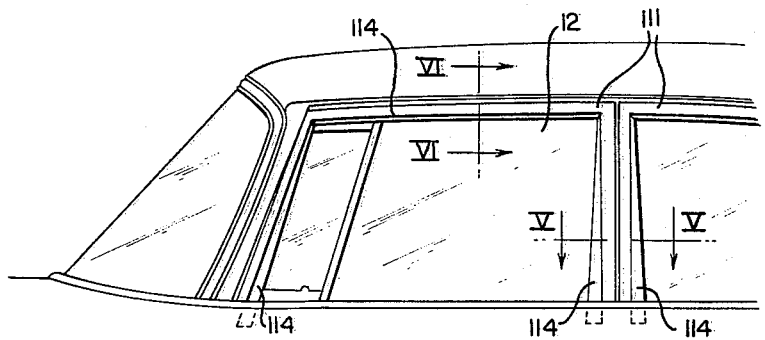
FIG. 4.
INVENTOR
ERWIN HITZELBERGER
BY Dicke, Craig and Freudenberg
ATTORNEYS March 26, 1963 E. HITZELBERGER 3,083,049
DOOR FRAME CONSTRUCTION FOR MOTOR VEHICLES
Filed July 13, 1959 2 Sheets-Sheet 2
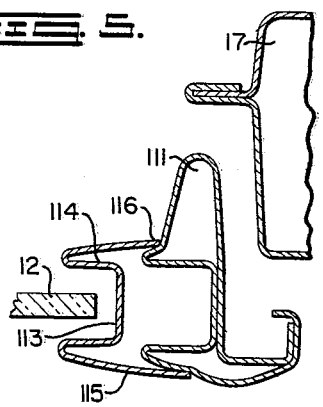
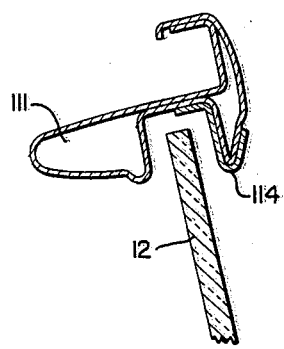
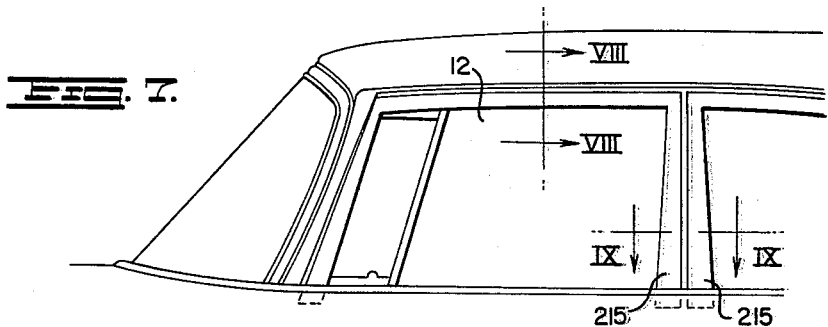
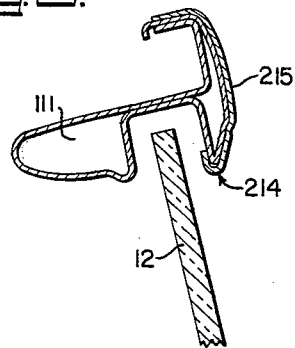
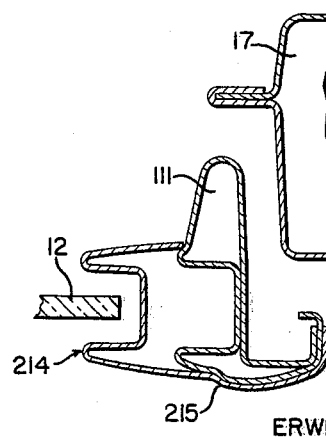
INVENTOR
ERWIN HITZELBERGER
BY Dicke, Craig and Freudenberg
ATTORNEYS United States Patent Office 3,083,049
Patented Mar. 26, 1963

3,083,049
DOOR FRAME CONSTRUCTION FOR MOTOR VEHICLES
Erwin Hitzelberger, Stuttgart-Rohr, Germany, assignor to Daimler-Benz Aktiengesellschaft, Stuttgart-Untertürkheim, Germany
Filed July 13, 1959, Ser. No. 826,842
Claims priority, application Germany July 16, 1958
4 Claims. (Cl. 296—44.5)

The present invention relates to the particular construction of the upper portion of the frame of motor vehicle doors, and more particularly to that portion of the door frame which is located above the window railing and in which the lowerable windows are slidably arranged within guide means the portions of which arranged above the window railing extend essentially vertically.

The arrangement of the window guide installations in doors for motor vehicles provided with lowerable window panes has to be made frequently with due regard to the presence of the vehicle door lock in such a manner that the guide rails leave to the lock actuating mechanism sufficient freedom of movement as required for proper operation thereof. The window guide means which are often times formed of pressed or stamped sheet metal parts which simultaneously represent the door frame disposed below the door window railing thereby extend at an incline within the door plane so that the distance between the window guide means and the door joint or gap continuously increases in the downward direction. This circumstance requires either a relatively very deep construction of the window guide means above the door window railing in order that the window pane, during lowering thereof, does not leave or slip out of the upper window guide means, or, in the alternative, the fact that one lateral edge of the window pane leaves or slips out of the corresponding guide means during lowering of the window pane has to be accepted whereby a gap between the door frame and the lateral edge of the window results therefrom.

This gap entails varied disadvantages. On the one hand, the non-guided window pane portion tends to be set into vibrations or swinging movements during the drive which cause, in addition to the always present wind noises, additional disturbing and annoying noises. On the other hand, during closure of the window, the danger exists that persons, especially children, through inadvertence or lack of attention pinch or squeeze the fingers between the lateral edge of the window and the door frame. Furthermore, the resulting window gap does not produce an aesthetically appealing view for the observer of the vehicle.

Consequently, in the prior art, the lateral window gap is avoided, as already mentioned hereinabove, by a deeper construction of the upper window guide means which prevents the window pane from leaving or slipping out of the guide means provided therefor. On the other hand, such an arrangement requires relatively wide upper door frames, when looking at the vehicle from the side thereof, which impair the free and otherwise less obstructed visibility on the part of the passengers from the vehicle interior space, and also render the vehicle relatively unpleasing or at least, of less appealing appearance in its lines.

The present invention is concerned with the problem of providing an upper door frame which obviates the disadvantages of the prior art constructions.

As a solution to the problem, the present invention proposes a door frame upper portion in which, as seen in side view of the vehicle, the width of a lateral part or of the lateral parts of the frame and possibly also the depth of the window guide means arranged therewithin decreases in the upward direction, i.e., from the lower to the upper part thereof.

According to one embodiment of the present invention, it is further proposed to complete the upper door-frame side portion or side portions, properly speaking, by a separate structural part which itself forms the guide means for the window and the lateral leg portions of which decrease in a continous manner in width thereof in the upward direction especially in a wedge-shaped or tapering manner.

Such an arrangement offers the possibility to utilize the separate structural parts according to the present invention simultaneously as decorative strips, or ornamental shields, preferably along the outer and inner side of the vehicle.

By the use of an arrangement in accordance with the present invention not only the visibility from the vehicle interior space toward the outside thereof is improved but also the vehicle itself receives simultaneously therewith a more pleasing appearance in side view thereof. The door frames which according to the present invention are kept relatively small or narrow in the upper section thereof permit a more free and unobstructed visibility to the passengers since this section of the door frame is arranged approximately at the height of the eyes of the passengers while seated within the vehicle. On the other hand, the lateral parts of the door frame which continuously increase in width in the downward direction prevent the lateral edges of the window pane from leaving or slipping out of the respective guide means.

The construction proposed in accordance with the present invention not only produces favorable effect with the front side doors of the vehicle but also with rear side doors which are pivotally secured or hingedly supported at the forwardly disposed ends thereof. With these types of rear doors, the rear part of the upper door frame, in most cases, normally extends downwardly rearwardly at an incline, following the contour of the roof frame, whereby the door gap is continued in the lower part of the vehicle body in the same direction so that the door lock or the actuating mechanism therefor no longer stands into the path of the window during opening thereof. On the other hand, it is a constant aim of those concerned with the design of motor vehicles to avoid as much as possible the gap between the rear edge of the window pane and the door frame which is produced during lowering of the window or else to relocate the occurrence of such gap as low as possible. However, this is possible only if the window pane, during the lowering movement thereof, at the same time moves rearwardly. The last-mentioned additional movement in the rearward direction on the part of the window pane toward the rear of the vehicle may be realized to a larger extent by an arrangement in accordance with the present invention without requiring also acquiescence in a continuous wider door-frame upper portion. With closed doors, not only a more pleasing appearance results thereby for the frame parts disposed between the front and rear window pane, but the construction in accordance with the present invention also entails technical advantages as regards an improved visibility from the vehicle interior space and simultaneously therewith avoids lateral window gaps during lowering of the window panes.

The same is also true in an analogous manner with forwardly hinged or suspended front doors which are devoid of lateral pivotal side windows.

By the provision of an only partial lateral covering of the supporting door frame above the window railing by means of the outer leg portions of the separate structural parts, there is achieved a multiple subdivision of the overall width of the door frame upper portion, especially if the vehicle in question is a four-door passenger motor vehicle with directly abutting upright frame parts of the side doors thereof. The four individual sections thereof may thereby be kept extremely slender whereby the sections formed by the separate structural parts which face the window panes are of wedge shape.

However, the present invention also entails advantages in connection with manufacturing considerations. By the use of separate structural parts for the guide arrangement of the windows, unitary or integrally pressed or stamped sheet metal parts are avoided which are normally difficult to manufacture. The connection between the supporting door frame, properly speaking, and the separate structural parts may be realized by simple securing means such as springy or yielding clamps or the like. Furthermore, the separate structural parts permit, in the simplest possible manner, a varying coloring scheme or surface treatment for the center section of the door-frame upper part, properly speaking, and for the shield or cover frame.

The inner leg portions of the separate structural parts simultaneously form in the direction toward the vehicle interior space the inner shield or cover frame so that additional door frame coverings may be dispensed with in that case.

Accordingly, it is an object of the present invention to provide guide means for lowerable window panes in motor vehicles which obviate the disadvantages of the prior art arrangements.

Another object of the present invention is the provision of a guide arrangement in the form of guide rails for the lowerable window panes of hinged motor vehicle doors which is simple in construction, effective to guide the lowerable windows over the entire lowering path thereof and which at the same time enhances the aesthetic appearance of the vehicle, as seen in side view.

Still another object of the present invention is the provision of a guide arrangement for the lowerable windows of motor vehicle doors which increases the visibility for the passengers within the vehicle interior space toward the outside thereof.

Another object of the present invention is the arrangement and construction of a guide arrangement for the lowerable window panes in motor vehicle doors which avoids the appearance of any gaps along the lateral edges of the window panes during the lowering thereof.

Still another object of the present invention is the provision of guide means for the lowerable windows of motor vehicle doors which renders the operation thereof safer and which simultaneously therewith may be used as a decorative shield or covering for the door frame.

These and other objects, features and advantages of the present invention will become more obvious from the following description when taken in connection with the accompanying drawing which shows, for purposes of illustration only, several embodiments in accordance with the present invention, and wherein:

FIGURE 1 is a partial side elevational view of a vehicle body provided with a unitary door-frame upper part in accordance with the present invention, FIGURE 2 is a cross-sectional view, on an enlarged scale, taken along line II—II of FIGURE 1, FIGURE 3 is a cross-sectional view, on an enlarged scale, taken along line III—III of FIGURE 1, FIGURE 4 is a partial side elevational view of a motor vehicle body provided with a modified embodiment of a two-partite door frame upper part in side view thereof, FIGURE 5 is a cross-sectional view, on an enlarged scale, taken along line V—V of FIGURE 4, FIGURE 6 is a cross-sectional view, on an enlarged scale, taken along line VI—VI of FIGURE 4, FIGURE 7 is a partial side elevational view of a motor vehicle body provided with still another embodiment of a two-partite door frame upper portion in accordance with the present invention in which the outer leg portion of the separate structural part completely surrounds the supporting door frame, properly speaking, FIGURE 8 is a cross-sectional view, on an enlarged scale, taken along line VIII—VIII of FIGURE 7, and FIGURE 9 is a cross-sectional view, on an enlarged scale, taken along line IX—IX of FIGURE 7.

Referring now to the drawing wherein like reference numerals are used throughout the various views to designate corresponding parts, and more particularly to FIGURES 1, 2 and 3, reference numeral 11 designates therein the lateral parts of the upper door-frame. As may be readily visible in FIGURES 1, 2 and 3 of the drawing, the width of the lateral parts 11 of the upper door frame decrease in the upward direction, i.e., decrease in width from the lower edge of the window opening in the door to the upper edge thereof so that a door frame results therefrom which has a wedged-shaped or tapering configuration as seen in side view. The door frame upper part or side parts 11 thereof may consist of one or several pressed or stamped sheet metal parts rigidly connected with each other in any suitable manner which form in the direction toward the window pane 12 a recessed upper guide channel or portion 13. Reference numeral 17 designates in FIGURES 1, 2 and 3 the center door post or column which is arranged between two lateral doors of the vehicle. The lower portion 13' of the guide channel which is disposed below the window railing extends downwardly at an incline and forms a continuation of the guide portion 13 disposed above the window railing, as may be readily seen in FIGURE 1.

In the embodiment illustrated in FIGURES 4, 5 and 6, the supporting door frame or door post 111, properly speaking, is completed by a further separate structural part 114 which itself forms the recessed guide means or guide channel 113 for the window pane 12 and simultaneously therewith forms, with the outer and inner leg portions 115 and 116 thereof, a decorative strip or ornamental shield toward the outside of the vehicle and with respect to the vehicle interior space. The width of the leg portions 115 and 116 decreases in the upward direction, i.e., from the lower edge of the window opening in the door toward the upper edge thereof. The width of door frame 111 is essentially constant as seen in side view.

The recessed guide means 113 according to the embodiment of FIGURES 4 through 6 has a constant depth so that the finished door-frame upper portion forms at every point a box-shaped rail in cross section whereby a further reinforcement is achieved.

The embodiment illustrated in FIGURES 7, 8 and 9 is different from that of FIGURES 4, 5 and 6 by the provision of extended leg portions 215 in the separate structural part 214 which completely surround the door frame upper portion 111 so that the latter is not visible at all to an observer standing on the outside of the vehicle. The leg portions 215 have an essentially horizontal portion covering the door frame above the window as may be readily seen in FIGURE 8.

While I have shown and described three embodiments in accordance with the present invention, it is understood that the same is not limited thereto but is susceptible of many changes and modifications within the spirit and scope of the present invention and I, therefore, do not wish to be limited to the details described and illustrated herein but intend to cover all such changes and modifications as are encompassed by the scope of the appended claims.

I claim:

1. In a motor vehicle, a side door having a window and a window railing below said window, window guide means for guiding said window during lowering movements thereof, said window guide means including an upper guide portion disposed above the window railing of the door, upper door frame means decreasing in width as seen in side view of the vehicle in the upward direction including a door frame part of essentially constant width as seen in side view and at least one separate structural part having means forming said upper guide portion, said separate structural part decreasing in width in the upward direction as seen in side view, said separate structural part including two spaced leg portions separated by said means forming said upper guide portion part and engaging with said door frame part to form a closed frame portion.

2. In a motor vehicle, the combination according to claim 1, wherein said separate structural part simultaneously serves as decorative shield on the outside and inside of the vehicle.

3. In a motor vehicle provided with a side door having a window and a window railing below said window, window guide means including an upper window guide portion of essentially constant depth disposed above the window railing of the door for guiding said window during movement thereof, means comprising upper door frame means decreasing in width as seen in side view of the vehicle in the upward direction including a frame part of essentially constant width as seen in side view and at least one separate structural part including an essentially vertical portion of essentially wedge-shaped configuration as seen in side view having means forming said upper window guide portion, said vertical portion of said separate structural part being secured to said frame part to form a closed frame portion, said separate structural part further including an essentially horizontal portion positioned above said window in the closed position thereof.

4. In a motor vehicle, a side door having a window and a window railing below said window, window guide means for guiding said window during movements thereof, said window guide means including an upper window guide portion disposed above the window railing of the door, said upper window guide portion being of essentially constant depth, upper door frame means decreasing in width as seen in side view of the vehicle in the upward direction including a door frame part of essentially constant width as seen in side view and at least one separate structural part forming said upper guide portion secured to said door frame part, said separate structural part including at least one leg portion decreasing essentially continuously in width in the upward direction as seen in side view and secured to said door frame part.

References Cited in the file of this patent
UNITED STATES PATENTS

| | | |
|---|---|---|
| 1,778,025 | Du Pont | Oct. 14, 1930 |
| 2,060,862 | Graebner | Nov. 17, 1936 |
| 2,214,947 | Wetzel | Sept. 17, 1940 |
| 2,269,747 | Widman | Jan. 13, 1942 |
| 2,298,515 | Sullivan | Oct. 13, 1942 |

FOREIGN PATENTS

| | | |
|---|---|---|
| 176,787 | Switzerland | Nov. 16, 1935 |